(12) United States Patent
Xu et al.

(10) Patent No.: US 10,757,199 B2
(45) Date of Patent: *Aug. 25, 2020

(54) HYBRID DELIVERY MECHANISM IN A MULTIMEDIA TRANSMISSION SYSTEM

(71) Applicant: Samsung Electronics Co., Ltd., Gyeonggi-do (KR)

(72) Inventors: Yiling Xu, Gyeonggi-do (KR); Sung-Ryeul Rhyu, Gyeonggi-do (KR); Jae-Yeon Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 4 days.

This patent is subject to a terminal disclaimer.

(21) Appl. No.: 16/159,164

(22) Filed: Oct. 12, 2018

(65) Prior Publication Data

US 2019/0045019 A1 Feb. 7, 2019

Related U.S. Application Data

(63) Continuation of application No. 13/704,523, filed as application No. PCT/KR2011/004362 on Jun. 14, 2011, now Pat. No. 10,104,184.

(Continued)

(51) Int. Cl.
*H04L 29/08* (2006.01)
*H04H 20/93* (2008.01)
(Continued)

(52) U.S. Cl.
CPC ............ *H04L 67/16* (2013.01); *H04H 20/93* (2013.01); *H04H 60/91* (2013.01); *H04L 65/4084* (2013.01); *H04L 67/42* (2013.01)

(58) Field of Classification Search
CPC ..... H04L 67/16; H04L 65/4084; H04L 67/42; H04H 60/91
(Continued)

(56) References Cited

U.S. PATENT DOCUMENTS

| 7,913,157 B1 | 3/2011 | Stoakley et al. |
| 2002/0103919 A1 | 8/2002 | Hannaway |

(Continued)

FOREIGN PATENT DOCUMENTS

| KR | 1020050032945 | 4/2005 |
| WO | WO 2010/054240 | 5/2010 |

OTHER PUBLICATIONS

Open Mobile Alliance, Service and Content Protection for Mobile Broadcast services, Draft Version 1.0.1 (Year: 2009).*
(Continued)

*Primary Examiner* — Sm A Rahman
*Assistant Examiner* — Chen-Liang Huang
(74) *Attorney, Agent, or Firm* — The Farrell Law Firm, P.C.

(57) ABSTRACT

A method and apparatus are provided for receiving service discovery information in a client in a hybrid delivery multimedia transmission system, the method including receiving service discovery information related to a service and comprising service type information indicating that the service is provided by a plurality of channels including a first channel of a first network and a second channel of a second network, the second channel being different from the first channel, in a plurality of networks including the first network and the second network, different from the first network, and parsing the service type information.

12 Claims, 12 Drawing Sheets

Related U.S. Application Data

(60) Provisional application No. 61/354,473, filed on Jun. 14, 2010.

(51) Int. Cl.
*H04H 60/91* (2008.01)
*H04L 29/06* (2006.01)

(58) Field of Classification Search
USPC .......................................................... 709/203
See application file for complete search history.

(56) References Cited

U.S. PATENT DOCUMENTS

| | | |
|---|---|---|
| 2003/0195979 A1 | 10/2003 | Park |
| 2004/0002896 A1 | 1/2004 | Alanen et al. |
| 2005/0083884 A1 | 4/2005 | Lee et al. |
| 2008/0010653 A1 | 1/2008 | Ollikainen |
| 2008/0199021 A1 | 8/2008 | Park |
| 2008/0244659 A1 | 10/2008 | Stallings |
| 2009/0300726 A1 | 12/2009 | Qian et al. |
| 2010/0120417 A1 | 5/2010 | Walker |
| 2010/0145794 A1 | 6/2010 | Barger et al. |
| 2010/0169504 A1 | 7/2010 | Gabin |
| 2011/0276705 A1 | 11/2011 | Stokking et al. |
| 2012/0039582 A1 | 2/2012 | Foo et al. |

OTHER PUBLICATIONS

3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 9), 3GPP TS 26.237 V9.3.0, Jun. 2010, 99 pages.

Korean Office Action dated Sep. 20, 2017 isssued in counterpart application No. 10-2012-7032779, 7 pages.

PCT/ISA/237 Written Opinion issued on PCT/KR2011/004362 (pp. 3).

PCT/ISA/210 Search Report issued on PCT/KR2011/004362 (pp. 3).

Open Mobile Alliance, Service and Content Protection for Mobile Broadcast Services, Draft Version 1.0.1, OMA-TS-BCAST_SvcCntProtection-V1_0_1-20100609-D, Jun. 9, 2010.

European Search Report dated Oct. 13, 2014 issued in counterpart application No. 11795959.3-1853.

Open Mobile Alliance, Service and Content Protection for Mobile Broadcast Services, Draft Version 1.0.1.

Service Guide for Mobile Broadcast Services Draft Version 1.1—Jun. 9, 2010, "OMA-TS-BCAST Service_Guide-V1-1-20100609-D-1".

Service Guide for Mobile Broadcast Services Approved Version 1.0—Feb. 12, 2009, Open Mobile Alliance "OMA-TS-BCAST Service Guide-V1_0-20091212-A".

Also see http://member.openmobilealliance.org/ftp/Public_documents/BCAST/Permanent_documents/.

\* cited by examiner

HYBRID DELIVERY MECHANISM IN A MULTIMEDIA TRANSMISSION SYSTEM

PRIORITY

This application is a Continuation of U.S. application Ser. No. 13/704,523, which was filed in the U.S. Patent and Trademark Office on Dec. 14, 2012 as a National Phase Entry of PCT International Application No. PCT/KR2011/004362, which was filed on Jun. 14, 2011, and claims priority to U.S. Provisional Patent Application No. 61/354,473, which was filed in the U.S. Patent & Trademark Office on Jun. 14, 2010, the contents of each of which are incorporated herein by reference.

BACKGROUND OF THE INVENTION

1. Field of the Invention

The present invention relates generally to a multimedia transmission system, and more particularly, to a hybrid delivery mechanism in a multimedia transmission system.

2. Description of the Related Art

An International Organization for Standardization (ISO) base file format has been proposed by the ISO/International Electrotechnical Commission ISO/IEC 14496-12 as a standard file format to be used for multimedia services. Having a flexible and extensible file structure, the ISO base file format is the basis of various multimedia file formats. The ISO base file format is designed to have an object-oriented structure so as to include various types of media resources and metadata, as a standardized file structure for packaging media resources and metadata. For example, the Joint Photographic Experts Group (JPEG) 2000, and 3rd Generation Partnership Project (3GPP) file formats are made based on the ISO base file format, and the Moving Picture Experts Group (MPEG)-4 file format is also an extension of the ISO base file format.

FIG. 1 illustrates a conventional format of an ISO base file.

The information and functions necessary for playing a plurality of media contents together are created as an object-based box. That is, the ISO base file is structured as a sequence of objects, some of which containing other objects. The sequence of objects in the ISO base file may contain a presentation metadata wrapper (a Movie Box), and the ISO base file contains one presentation metadata.

In FIG. 1, an ISO base file 101 includes a movie box 'moov' box 103 and a media data box 'mdat' box 105.

The 'moov' box 103 stores temporal and spatial position information and codec information for the media data stored in the media data box 105, and the 'moov' box's sub-boxes define the metadata for a presentation.

The 'mdat' box 105 contains the actual media data for a presentation. That is, the 'mdat' box 105 stores media data (or a media stream) such as video and audio.

In the 'moov' box 103, tracks 'trak' 107 (video, 109 (audio), and 111 (hint) include a timed sequence of related samples in the ISO base media file. The 'trak' 107 includes information about audio data, while 'trak' 109 includes information about video data and 'trak' 111 includes information for a streaming service.

However, the conventional art suffers from the lack of a hybrid delivery mechanism for client and server.

SUMMARY OF THE INVENTION

Accordingly, the present invention has been made to address at least the above-mentioned problems and/or disadvantages and to provide at least the advantages described below.

Accordingly, an aspect of the present invention provides hybrid delivery mechanism based on a file format in a multimedia transmission system.

According to an aspect of the present invention, a method for receiving service discovery information in a client in a hybrid delivery multimedia transmission system includes receiving service discovery information related to a service and comprising service type information indicating that the service is provided by a plurality of channels including a first channel of a first network and a second channel of a second network, the second channel being different from the first channel, in a plurality of networks including the first network and the second network, different from the first network, and parsing the service type information, wherein one or more first service components of the service are transmitted to the client over the first channel of the first network and one or more second service components which are different from the one or more first service components, are transmitted to the client over the second channel of the second network, wherein the service discovery information further comprises relation information indicating a relationship between content of the one or more first service components and content of the one or more second service components, and network and address information for accessing the one or more first service components and the one or more second service components, wherein the first network is a broadcast network and the second network is a telecommunication network, wherein the network and address information for accessing the one or more first service components includes information about a frequency, an Internet protocol (IP) platform, and a first IP address, and wherein the network and address information for accessing the one or more second service components includes a uniform resource locator and a second IP address.

According to another aspect of the present invention, a client apparatus for receiving service discovery information in a hybrid delivery multimedia transmission system includes a receiver configured to receive service discovery information related to a service and comprising service type information indicating that the service is provided by a plurality of channels including a first channel of a first network and a second channel of a second network, the second channel being different from the first channel, in a plurality of networks including the first network and the second network, different from the first network, and a parser configured to parse the service type information, wherein one or more first service components of the service are transmitted to the client over the first channel of the first network and one or more second service components which are different from the one or more first service components are transmitted to the client over the second channel of the second network, wherein the service discovery information further comprises relation information indicating a relationship between content of the one or more first service components and content of the one or more second service components, and network and address information for accessing the one or more first service components and the one or more second service components, wherein the first network is a broadcast network and the second network is a telecommunication network, wherein the network and address information for accessing the one or more first service components includes information about a frequency, an Internet protocol (IP) platform, and a first IP address, and wherein the network and address information for accessing the one or more second service components includes a uniform resource locator and a second IP address.

BRIEF DESCRIPTION OF THE DRAWINGS

The above and other features, aspects, and advantages of the present invention will be more clearly understood from the following detailed description taken in conjunction with the accompanying drawings, in which.

DETAILED DESCRIPTION OF EMBODIMENTS OF THE INVENTION

Figure 1:
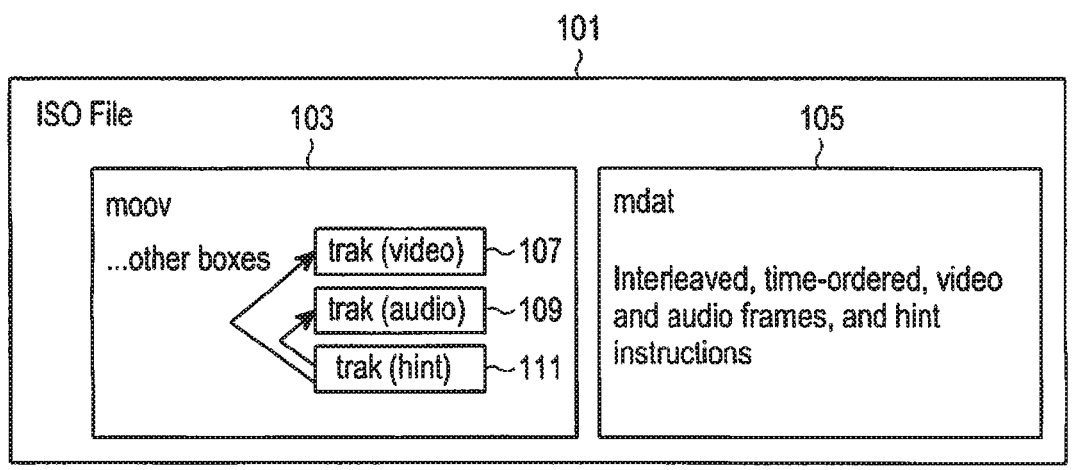
FIG. 1 illustrates the conventional format of an ISO base file.

Embodiments of the present invention are described in detail with reference to the accompanying drawings. The same or similar components may be designated by the same or similar reference numerals although they are illustrated in different drawings. Detailed descriptions of constructions or processes known in the art may be omitted for the sake of clarity and conciseness.

Figure 2:
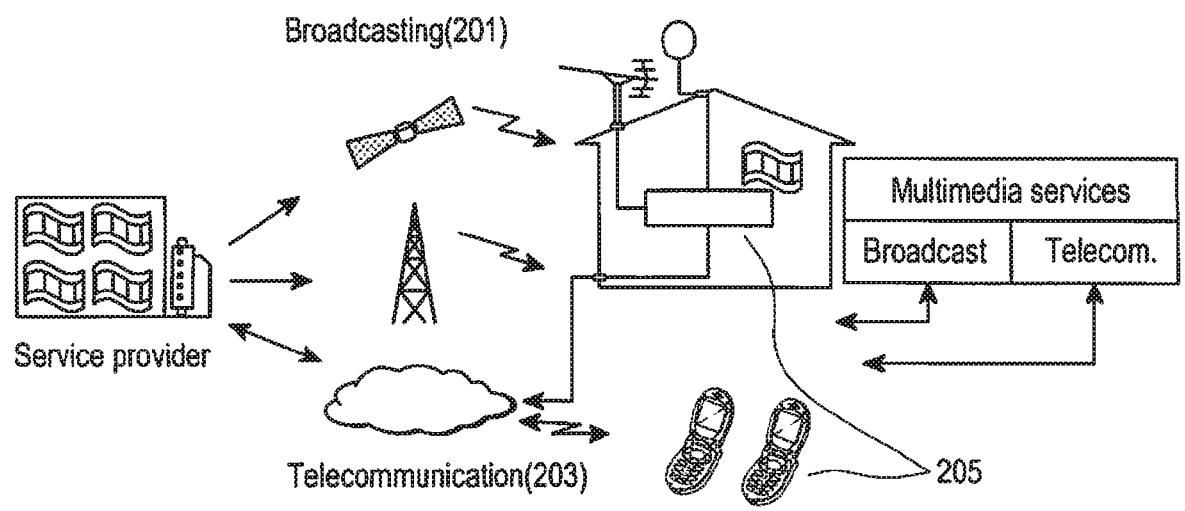
FIG. 2 illustrates a hybrid delivery system.

In the hybrid delivery system illustrated in FIG. 2, content may be delivered over a hybrid network. That is, some components may be delivered over broadcast network and some components may be delivered over telecommunication network. Different networks have their own advantages and limitations, e.g. a broadcast network could serve many viewers (i.e., p-t-m) simultaneously and stably, but only in a unidirectional transmission. Telecommunications could satisfy a special request (i.e., p-t-p) from some users based on a bidirectional network, but may incur congestion problems.

The hybrid network according to an embodiment of the present invention provides services with the advantages of both networks (broadcast and telecommunication networks), and discloses the mechanism to support hybrid content delivery.

Hybrid Delivery Indication

In a hybrid delivery system, a client 205 may receive a service from different delivery paths, such as one component from broadcast network 201, and another from telecommunication network 203. The client should combine these components and then consumes the service. In the present invention, the term 'hybrid delivery' and 'hybrid delivery mechanism' refer to a method or system for providing multimedia service component via different networks (or delivery paths).

The hybrid delivery may not be supported by every client, and some clients may not desire the hybrid delivery because of high costs and a complicated process of the hybrid delivery. For this purpose, a client should easily and quickly know whether the service type is hybrid.

Figure 3:
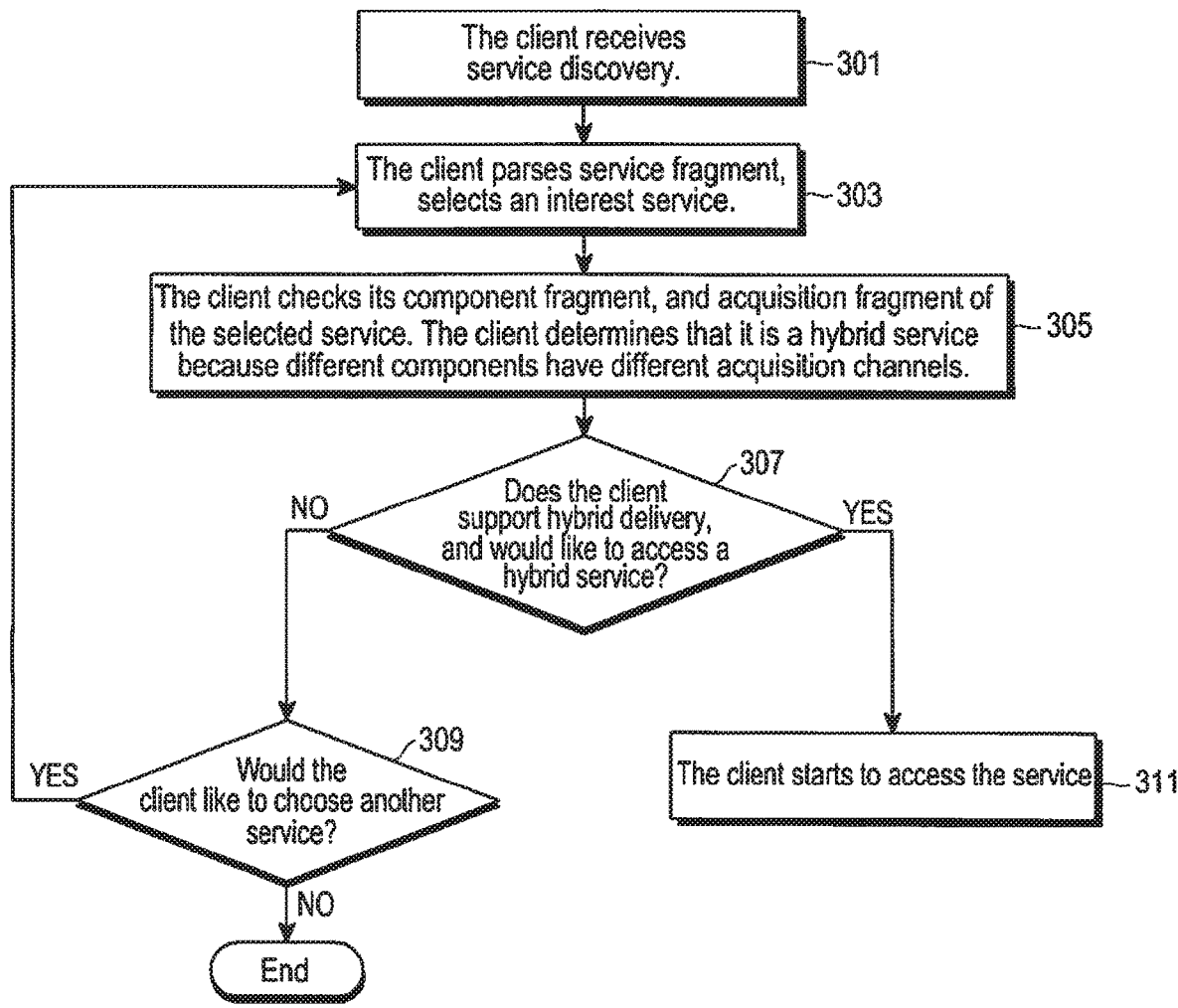
FIG. 3 illustrates a process of accessing service by a client without hybrid indication in a multimedia transmission system, according to an embodiment of the present invention.

Based on the current mechanism, a client's procedure for accessing a service is illustrated in FIG. 3, which illustrates a process of accessing service by a client without hybrid indication in a multimedia transmission system, according to an embodiment of the present invention.

A client receives service discovery information (e.g., a service discovery entity) from service provider (or server) via various networks in step 301. A service discovery entity is used to describe an available service and its access information. Specific features about the service discovery entity will be described in FIG. 13, and a detailed structure of the service discovery entity will be discussed later in the present disclosure.

The Client parses a services fragment and selects an interest service in step 303. The Client checks a component fragment and an acquisition fragment of the selected service in step 305, and determines that the interest service is hybrid service because the different components of the interest service have a different acquisition channel in step 305. That is, the Client could not decide whether the interest service is hybrid when the client chooses the interest service from the service fragment. Only after the client parses all components belonging to this interest service and their acquisition fragment, may the client know that the interest service is a hybrid delivery case.

The client determines whether the client may support the hybrid delivery service and would like to access the hybrid service in step 307. If the client does not support the hybrid delivery service and the client would not like to access the service, the client determines whether the client would like to select another service again in step 309. Depending on the determination, the client will give up or select the service again. However, time has been lost and costs have already been incurred before determining the type of the interest service. On the other hand, if the client support hybrid delivery or the client would like to access such service 307, the client starts to access the interest service in step 311.

Hybrid Signaling in ServiceType a 'Hybrid' type may be specified in the ServiceType 1307 as shown in the following Table 1. The ServiceType could signal whether a service is from one channel, from different channels within one type of network, or even different channels of different type of networks. Selectively, the ServiceType may be an attribute of metadata, or a field of any data structure.

TABLE 1

| Type | Description |
| --- | --- |
| 1 | From one delivery channel |
| 2 | From different channels in one type of network, e.g. from two channels of a broadcast network. |
| 2.1 | The service/component from another channel of the same network is mandatory for the currently described service. |
| 2.2 | The service/component from another channel of the same type of network is not mandatory for the currently described service. |
| 3 | From different channels in different type of networks, e.g. one is from broadcast, and another is from telecommunication. |
| 3.1 | The service/component from another channel of the different network is mandatory for the currently described service. |
| 3.2 | The service/component from another channel of the different type of network is not mandatory for the currently described service. |
| Other | Reserved for other types used in the future. |

A service fragment 1301 could be sent more frequently than other service information to the client, so the client could more quickly parse and choose the service.

Figure 4:
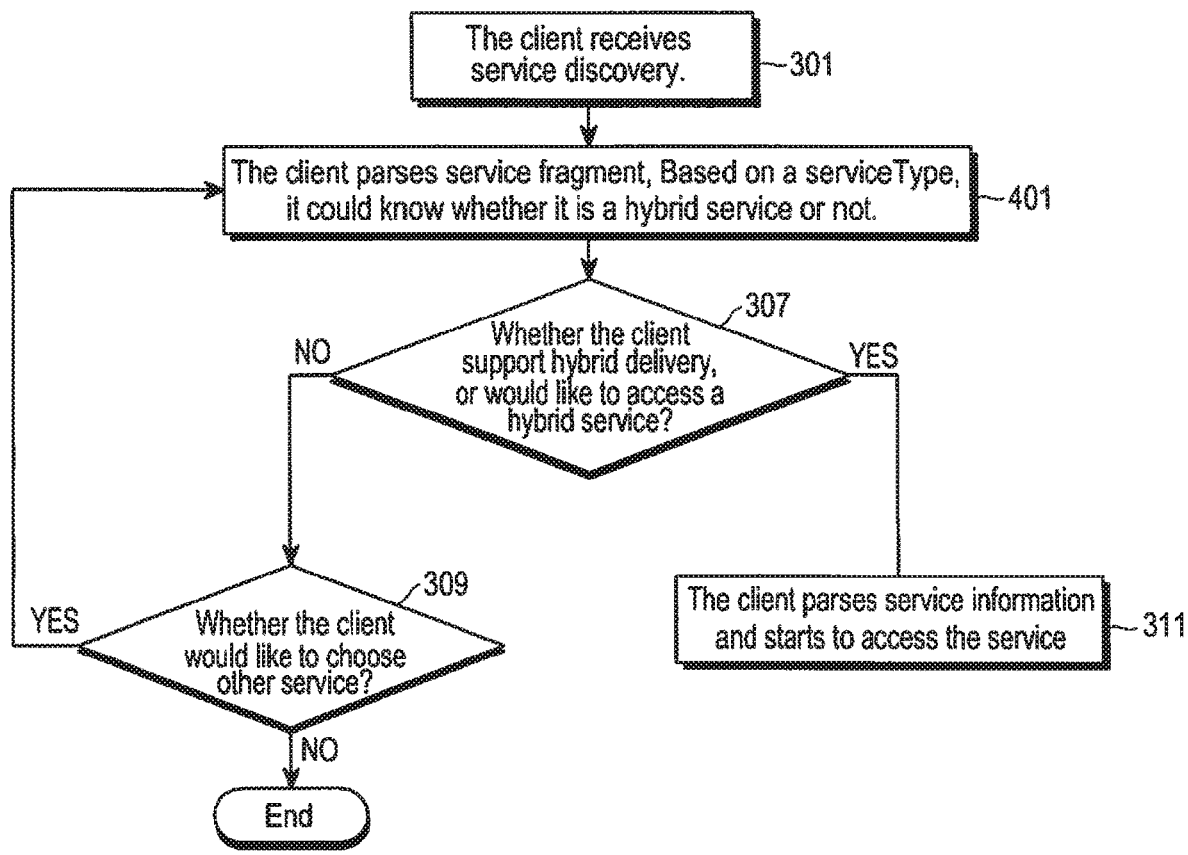
FIG. 4 illustrates a process of accessing service by a client with hybrid indication a multimedia transmission system, according to an embodiment of the present invention.

Based on this new signaling, a client's accessing service process according to an embodiment of the present invention is illustrated in FIG. 4.

A client receives a service discovery entity from the service provider via various networks in step 301. When the client parses service fragment 1301 in step 401, the client already could know whether the service is a hybrid service based on the ServiceType. That is, the client doesn't need to parse component and acquisition information for recognizing that the service is hybrid. Thus, signaling by using the ServiceType within a service fragment is a shortcut for the client to make the decision.

In FIG. 4, one or more steps may be omitted while implementing embodiments of the present invention.

Service/Component Relationship Signaling

Different hybrid scenarios and use cases are required in the market, which necessitates service/component relationship signaling for supporting the hybrid delivery.

For example, one service is a football game provided by one operator (i.e., service provider), and another service is the introduction of the team members in the football game provided by some other users. The client does not know that these two services could be combined to receive rich information without signaling for relationship between the two services.

In another example, one service is a world-wide travel program, and another service is a local advertisement program (e.g., food introduction or restaurant information that is related to a region in the travel program) provided by local service providers. If the client could know the relationship of these two services in advance, the client could choose both of the services. In this case, the advertisement information will appear in the client's screen when the related region is shown in the travel program.

Figure 13:
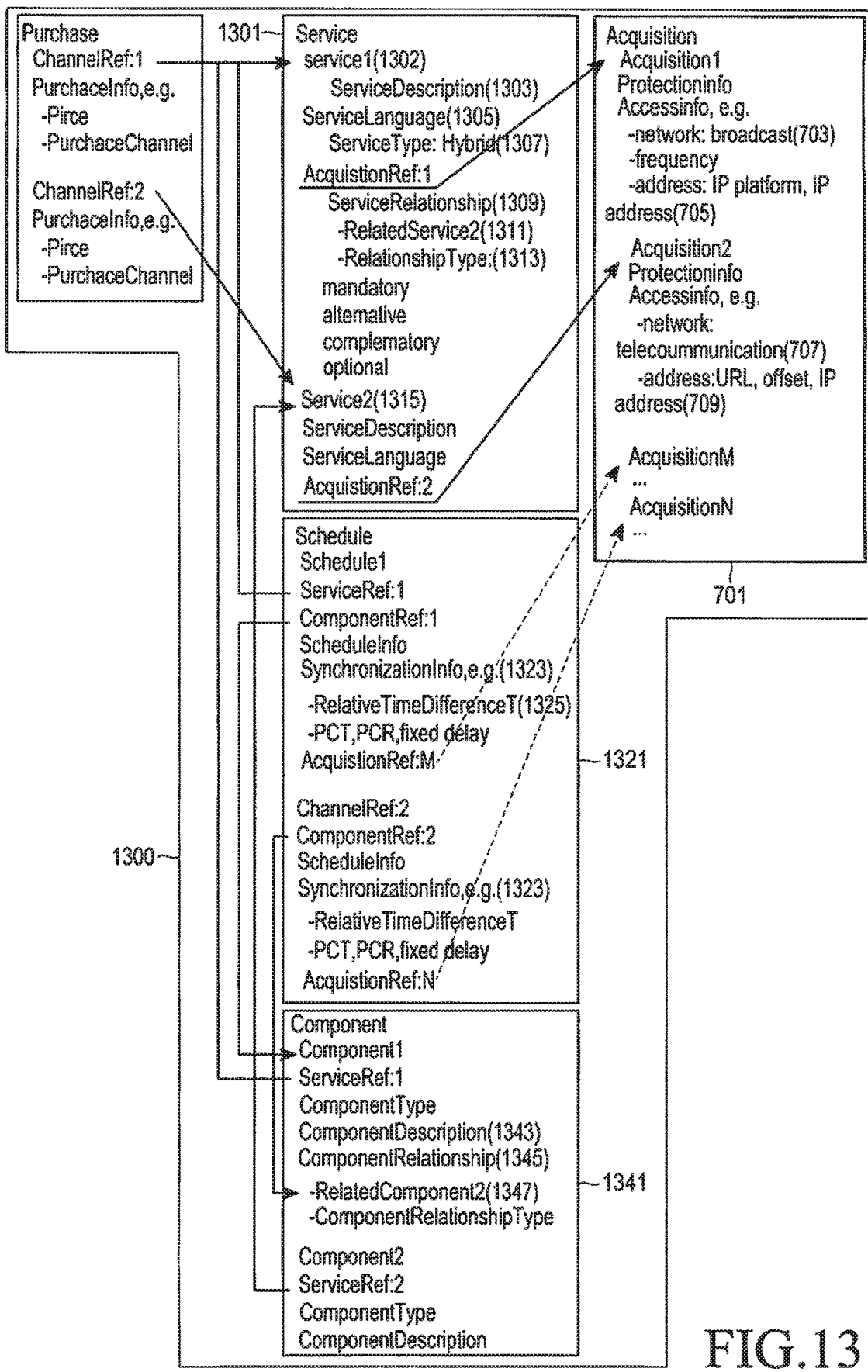
FIG. 13 illustrates a structure of a service discovery entity for hybrid delivery, according to an embodiment of the present invention.

For satisfying various hybrid use case requirements, the serviceRelationship 1309/component relationship 1345 is disclosed for signaling, as shown in FIG. 13 which illustrates a structure of a service discovery entity for hybrid delivery, according to an embodiment of the present invention.

In the hybrid case, the relationship among service/component may be signaled.

*59RelatedServiceID 1311/RelatedComponentID 1347 indicates which service/component is related.

RelationshipType 1313 is a signal indicating the possible types of relationships. The following are examples of values of the RelationshipType.

1) Mandatory indicates the referred channel is mandatory for this service. For example, video is in service1/component1 and audio is in service2/component2, and both services/components should be needed to consume a complete service.

2) Alternative indicates the referred service/component could be the alternative choice for the described service. For example, service 1 is BBC news video and audio in English, and service2 is BBC news audio in French. The client could choose the service 1 only, or combine the video in the service 1 and audio in the service2. The details about each service (i.e., service1 and service2) could be signaled in ServiceDescription 1303 and ServiceLanguage 1305.

3) Complementary indicates that the referred service/component could be the complementary for the described service/component. For example, a user (or a client) is watching a foreign language movie with a basic subtitle via a broadcast channel from a service provider, but the user may require Subtitling for Deaf and Hard-of-hearing (SDH) subtitle. In this case, the user will send a request to receive an SDH subtitle for this movie to the service provider (or other service provider) using a telecommunication channel (or the broadband channel). The network sends the requested SDH subtitle to the user's terminal device over the broadband channel (or the telecommunication channel). The terminal device then replaces the basic subtitle of the movie with the SDH subtitle and displays it to the user to allow the user to enjoy the movie.

4) Optional indicates the referred service/component is optional when the client access the described service (e.g., a local advertisement for a travel program).

A serviceRelationship 1309 may be signaled in the service fragment 1301, and a componentRelationship 1345 may be signaled in the component fragment 1341. The detailed description for each service/component could also be signaled ServiceDescription 1303/componentDescription 1343, such as bitrate, resolution, quality and language. This description will help the client to choose an expected one of these parameters.

Synchronization

Figure 5:
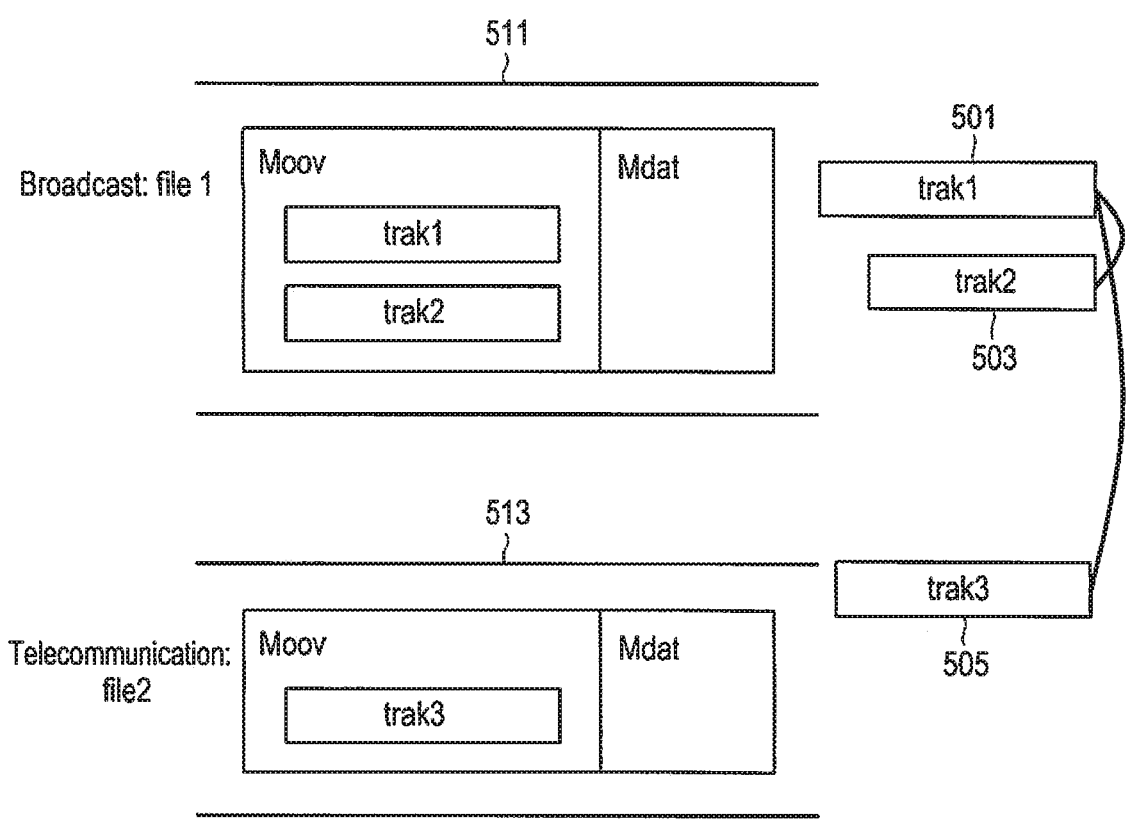
FIG. 5 describes a synchronization problem in hybrid delivery, according to an embodiment of the present invention.

A synchronization problem is a key problem in a hybrid delivery mechanism. As an example in FIG. 5, which describes a synchronization problem in hybrid delivery, according to an embodiment of the present invention, different files are delivered in different channels, e.g. one in a broadcast channel and another in a telecommunication channel Two or more tracks (or 'trak's) 501, and 503 inside one file 511 could be synchronized based on a decoding time, composition time, and edit list in the 'moov' box. However, it is not known how to synchronize the two or more tracks (or 'trak's) 501, and 505 sent in two or more different files 511, and 513 is also unknown.

Figure 6:
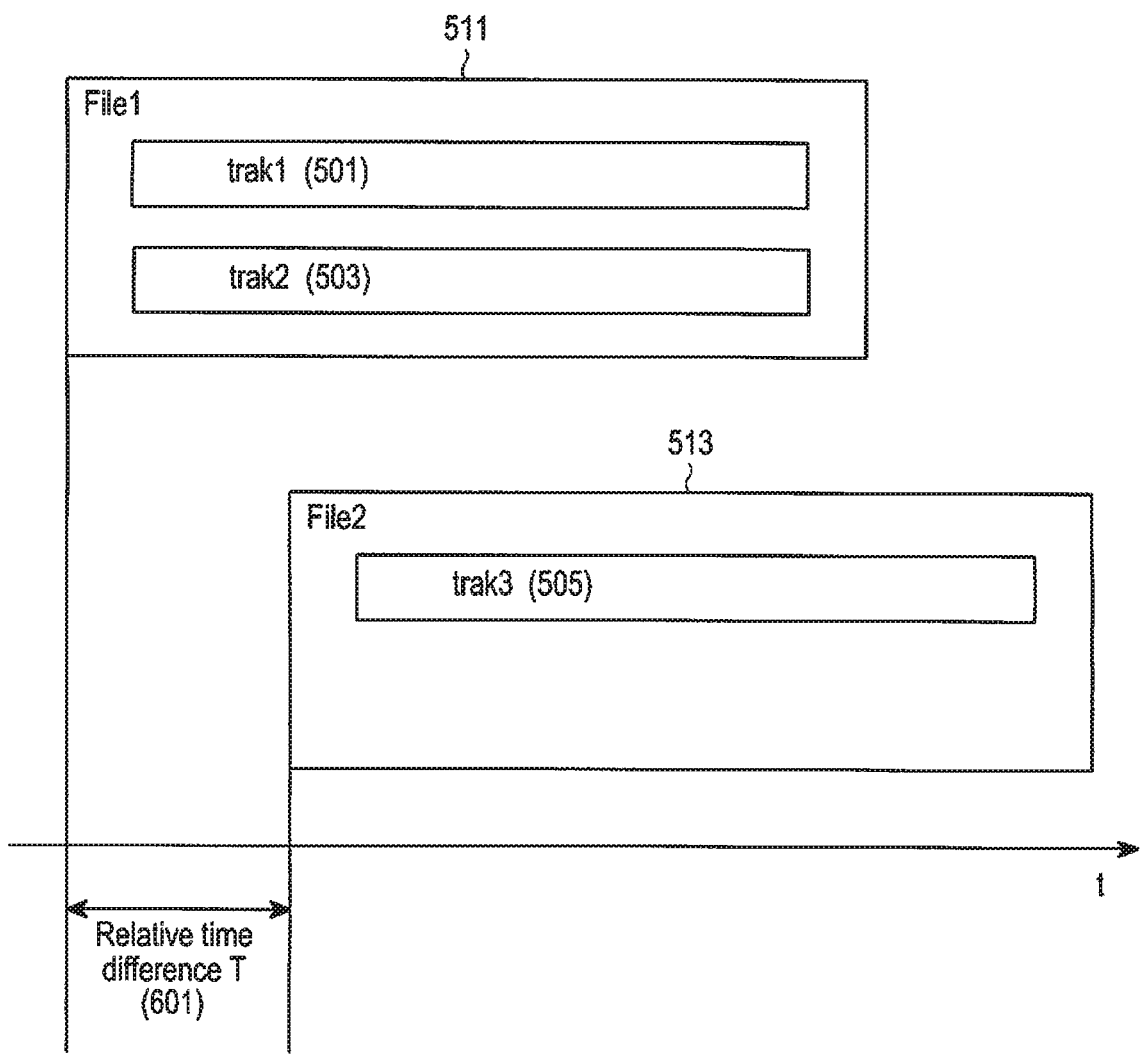
FIG. 6 describes a solution to the synchronization problem in hybrid delivery, according to an embodiment of the present invention.

The relative time difference between files (i.e., ISO files) in the hybrid delivery should be signaled, as in FIG. 6, which describes a solution to the synchronization problem in hybrid delivery, according to an embodiment of the present invention.

A relative time difference T 601 between file1 511 and file2 513 is indicated. Based on the relative time difference T, the client could know how to synchronize the tracks (or 'trak's) 501, and 505 within these two files 511, and 513. Information required for indicating the relative time difference T is described as shown in Table 2.

TABLE 2

| Field | Description |
|---|---|
| FileID | File identifier that has a reference file from another channel |
| Referred fileID | The referred file identifier |
| T | The relative time difference between the file and referred file |

Referring again to FIG. 13, the information indicating the relative time difference T may be included (or recorded) in a service discovery entity 1300, e.g. schedule fragment 1301, or in the media level, e.g. moov box. For example, the schedule fragment 1321 may include the Synchronization-Info 1323 or RelativeTimeDifference (T) 1325.

Acquisition Information

Figure 7:
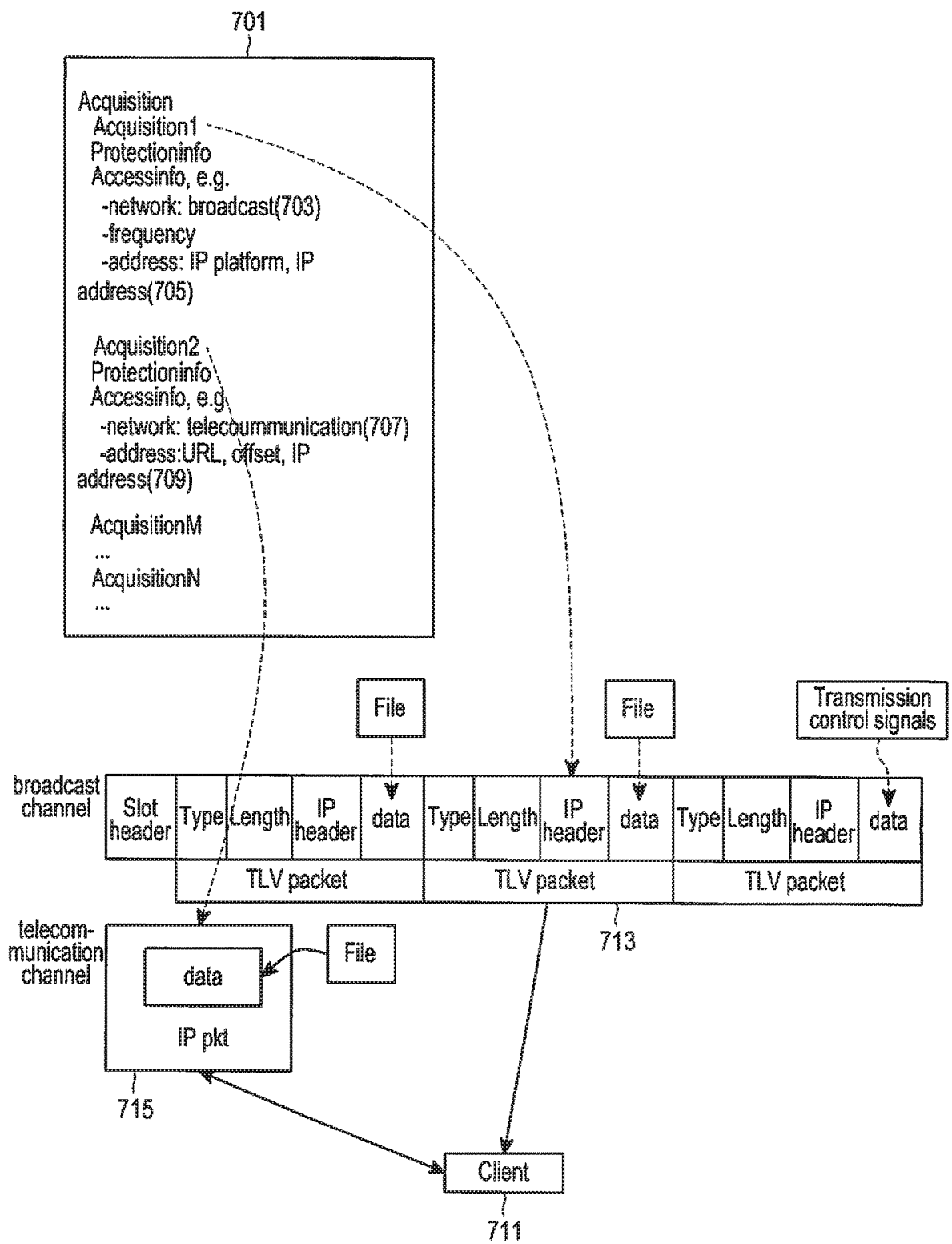
FIG. 7 illustrates an acquisition example in hybrid delivery, according to an embodiment of the present invention.

FIG. 7 illustrates an acquisition example in hybrid delivery, according to an embodiment of the present invention. Because each service/component may come from totally different channels or networks, acquisition information (e.g., acquisition fragment 701) may be signaled.

In the acquisition fragment 701, an access network and address for each channel in the hybrid case could be signaled.

Network type 703 of channel1 is broadcast, and network type 707 of channel2 is telecommunication. Thus, a client 700 could start to receive the correct entity from each channel, i.e. TLV (Type Length Value) packet 713, and IP (Internet protocol) packet 715 from the broadcast channel, and telecommunication channel, respectively. In the broadcast network, at least one of the frequency, IP platform, and IP address 705 may be signaled. In the telecommunication network, at least one of URL (Uniform Resource Locator), offset, and IP address 709 may need to be signaled.

Define New Tag Value for Service Discovery in TLV Protocol

A service provider may use TLV protocol for providing services in a hybrid delivery system. For example, the NHK (a Japan Broadcasting Corporation) has disclosed using the TLV protocol in a hybrid delivery system. Since hybrid service information is carried in a service discovery entity, it is important for a client to find and parse the service discovery entity. The missing criteria is how to signal the service discovery entity based on TLV protocol.

Figure 8:
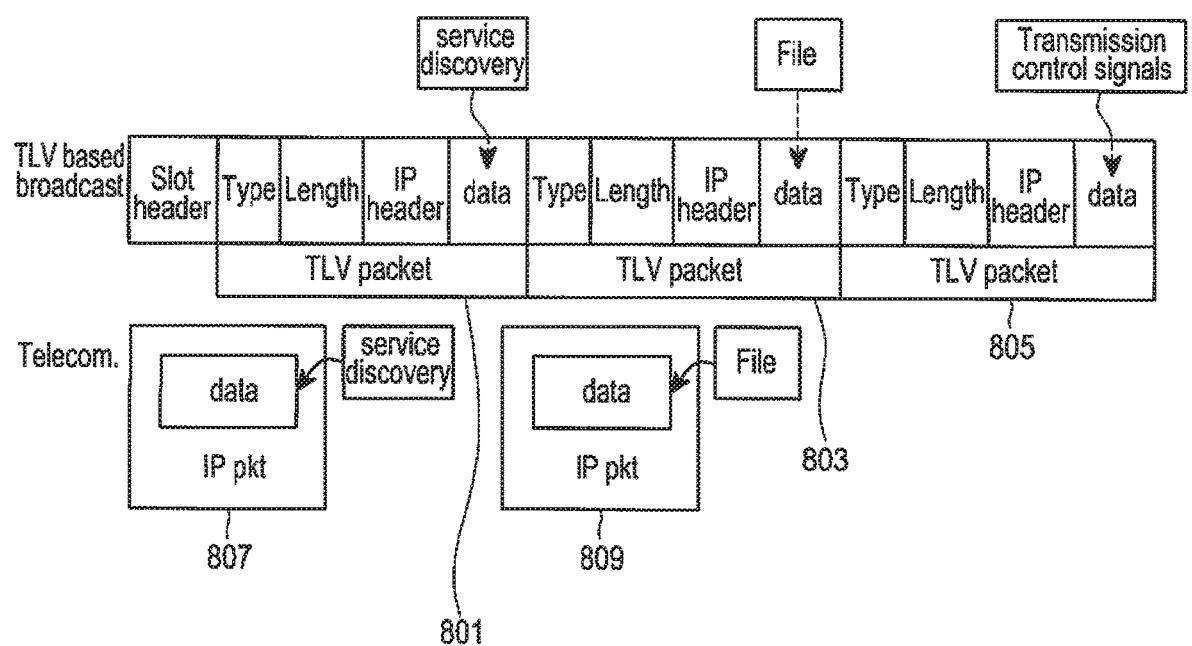
FIG. 8 illustrates a service discovery entity in a TLV (Type Length Value) packet, according to an embodiment of the present invention.

FIG. 8 illustrates a service discovery entity in TLV packet, according to an embodiment of the present invention.

Some specific TLV packet 801, and 807 could be used for service discovery, and other packets could be used for media data file 803, and 809, and transmission control signal 805. A specific tag and value for different types of packets are defined in Table 3, as follows.

TABLE 3

| Tag Value | Type |
|---|---|
| 10 | Service Discovery |

A tag value '10' is reserved (or defined) for service discovery. Otherwise, any other tag value may be reserved (or defined) for the service discovery.

Client/Server Procedure

Figure 9:
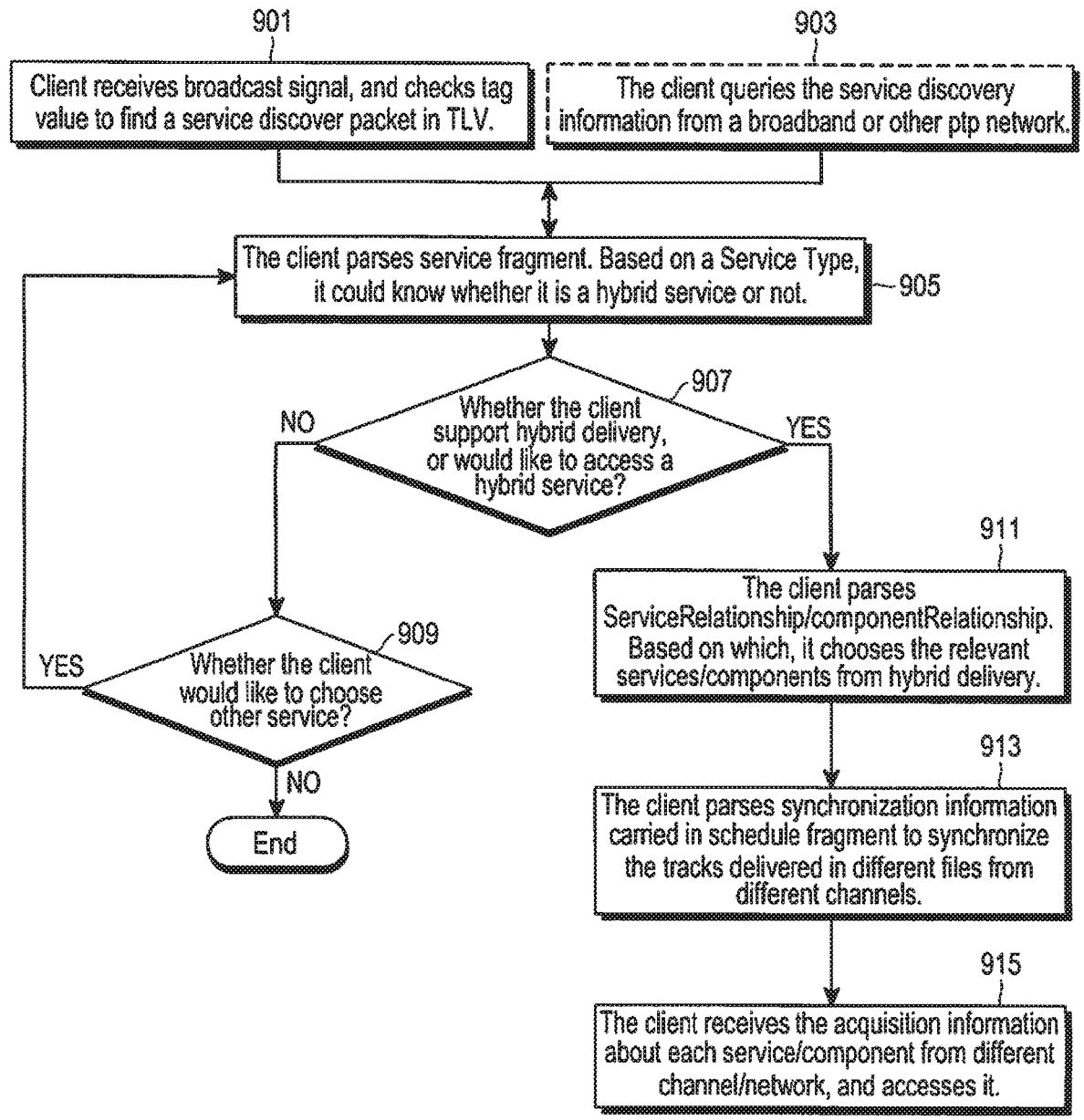
FIG. 9 illustrates a process of accessing service by a client, according to an embodiment of the present invention.

FIG. 9 illustrates a process of accessing service by a client, according to an embodiment of the present invention.

A client receives a broadcast signal and checks a tag value to find service discovery information (e.g., a service discovery entity 1300) in TLV packets in the received broadcast signal in step 901. Selectively, the client could access the service discovery information from one of telecommunication network, broadband network, and other p-t-p networks in step 903.

After receiving service discovery information, the client parses service fragment 1301 and checks ServiceType to know whether an interest service is hybrid service in step 905.

If the service is hybrid service, the client determines whether the client could support the service and desires to access the service in step 907.

Based on the determining in step 907, if the client could not support the service and does not desire to access the service, the client further determines where the client would like to choose another service in step 909.

Depending on the determining in step 909, the client will choose another service to access by returning to step 905; otherwise, the client will stop parsing the service fragment.

Based on the determining in step 907, if the client could support the service or desires to access the service, the client may check the ServiceRelationship/ComponentRelationship to find the related service in the other channels, and check their relationship in step 911. Based on their relationship, the client could choose the relevant services/components in step 911.

By parsing synchronization information between files from different channels, the client could know how to synchronize the files from different channels in step 913. The synchronization information may be included in a schedule fragment 1321 of the received service discovery entity.

Based on acquisition information (e.g., a acquisition fragment 701), the client could know access information of each service/component from different channels/networks and access the service/component in step 915.

In the procedure illustrated in FIG. 9, one or more steps may be omitted.

In this procedure, information related to the hybrid delivery is carried in the service discovery entity 1300. The information related to the hybrid delivery could also be carried in a media level.

Figure 10:
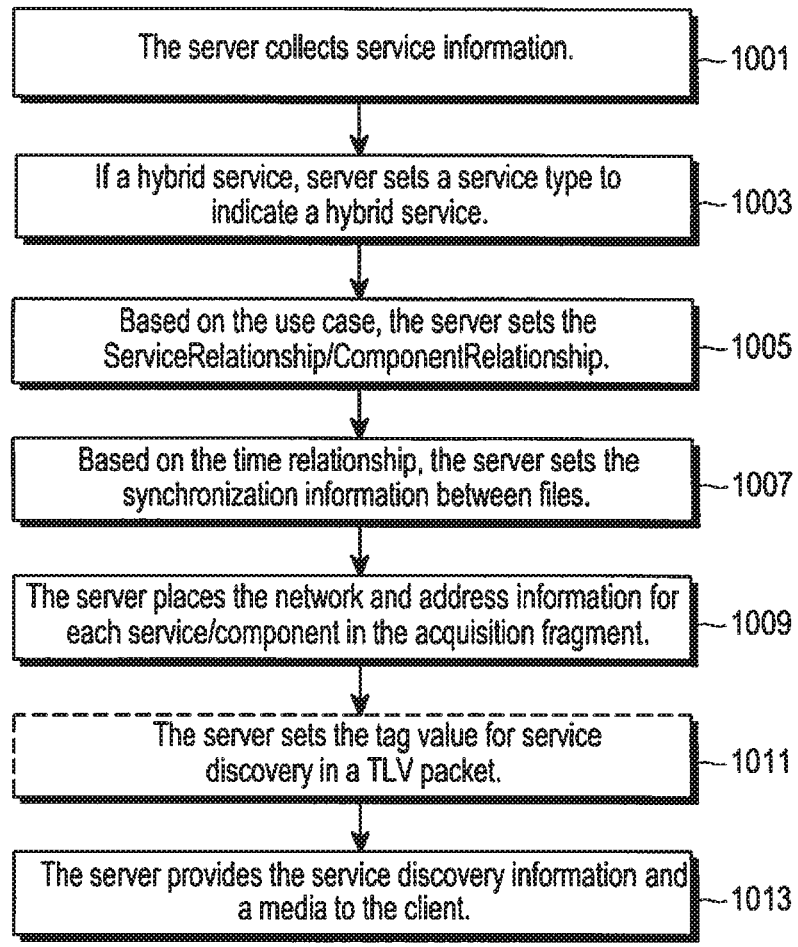
FIG. 10 illustrates a process of providing service discovery information by a server, according to an embodiment of the present invention.

FIG. 10 illustrates a process of providing service discovery information by a server, according to an embodiment of the present invention.

The server will collect service information that is related to a service to be provided in step 1001.

If the service is hybrid service, the server will set a value of ServiceType to indicate that the service is hybrid in step 1003.

Based on use cases, the server indicates their relationship between services and/or components by ServiceRelationship/ComponentRelationship in step 1005.

The server sets a value of synchronization information between files in step 1007. The synchronization information may be a relative time difference T and may be included in a schedule fragment 1321.

The server sets values for access information e.g. network information, and address information in step 1009.

When service discovery information is transmitted in broadcast channel using TLV packet, the server sets a tag value for the service discovery information in step 1011.

Then the server will provide this information and media-related file to one or more clients in step 1013.

In the procedure illustrated in FIG. 10, one or more steps may be omitted.

Client/Server Structure

Figure 11:
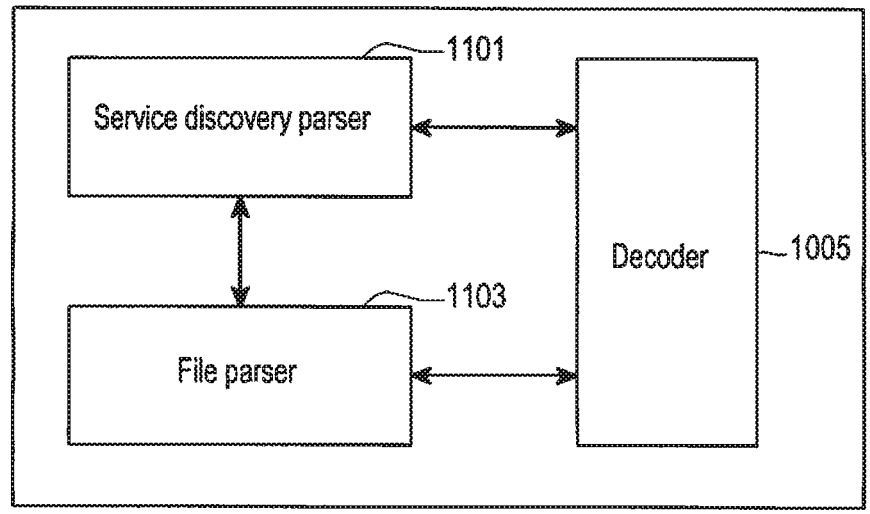
FIG. 11 illustrates a structure of a client in a multimedia transmission system, according to an embodiment of the present invention.

FIG. 11 illustrates a structure of a client apparatus in a multimedia transmission system, according to an embodiment of the present invention.

The client apparatus may include one or more entities, such as a service discovery parser 1101, file parser 1103, and decoder 1105. The service discovery parser 1101 will parse service discovery metadata (e.g. service discovery entity), and choose the service for accessing. Hybrid related signaling is carried in the service discovery metadata, and the media data and related information is processed in the file parser 1103, and decoder 1105 for playing. The file parser 1103 parses the media data, and the decoder 1105 decodes the media data the decoded media data (file). The client apparatus may further include a receiver (not shown) for receiving data from a server.

Figure 12:
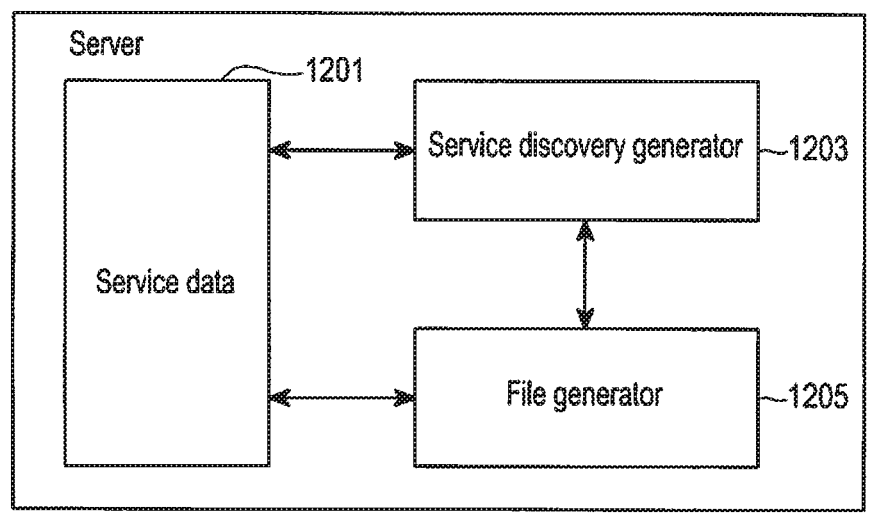
FIG. 12 illustrates a structure of a server in a multimedia transmission system, according to an embodiment of the present invention.

FIG. 12 illustrates a structure of a server apparatus in a multimedia transmission system, according to an embodiment of the present invention.

The server apparatus may include one or more entities, such as service data 1201, service discovery generator 1203, and file generator 1205. The service data 1201 may be memory or data storage for raw data to be provided as a media service. Based on the service data 1201, the server discovery generator 1203 generates service discovery metadata to be transmitted to one or more clients. The file generator 1205 generates one or more files to be transmitted to the clients. The files have media data and its related presentation information. The server apparatus may further include a transmitter for transmitting data to one or more clients.

Reference will now be made again to FIG. 13, which illustrates an example when new signaling according to an embodiment of the present invention is carried in a service discovery level.

In this example, two services, service1 1302, and service2 1315 are delivered in different channels, broadcast and telecommunication, respectively. Thus, the services are in the hybrid delivery mechanism.

The relationship between service1 and service2 is indicated in ServiceType 1037. Their component fragment 1341, schedule fragment 1321, synchronizationinfo 1325 are also given. The services 1302, and 1315 could have different purchase information if they are independently provided. Their network information 703, and 707, and address information 705, and 709 could be found in an acquisition fragment 701, as shown in FIG. 7.

In FIG. 13, two services are delivered in different channels. It could also be possible that two components within one service are delivered in different channels. The service is then set as hybrid service, and the relationship between components is signaled in the component level, such as ComponentRelationship 1345, and RelatedComponent 1347.

The above-described embodiments of the invention may be embodied as hardware, software or a combination of hardware and software. Software may be stored in a volatile or non-volatile storage device such as Read Only Memory (ROM) and the like irrespective of erasing or rewriting, a memory such as a Random Access Memory (RAM), a memory chip, a device, and a integrated circuit, or a storage medium that is capable of performing optical or magnetic recording and machine-reading such as Compact Disc (CD), Digital Versatile Disc (DVD), optical disc, and magnetic tape. A memory may be an example of machine-readable storage media that are suitable for storing a program including instructions to implement the embodiments, or programs. Therefore, the invention may include a program including a code to implement an apparatus or a method claimed in a claim of the specification, and a machine-readable storage medium including the program, for example, a computer-readable storage medium. The program may be transferred electronically through a medium such as a communication signal transferred through a wired or wireless connection, and the invention may appropriately include an equivalent medium.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for receiving service discovery information in a client in a hybrid delivery multimedia transmission system, comprising:
   receiving service discovery information related to a service and comprising service type information indicating that the service is provided by a plurality of channels including a first channel of a first network and a second channel of a second network, the second channel being different from the first channel, in a plurality of networks including the first network and the second network, different from the first network; and
   parsing the service type information,
   wherein one or more first service components of the service are transmitted to the client over the first channel of the first network and one or more second service components which are different from the one or more first service components, are transmitted to the client over the second channel of the second network,
   wherein the service discovery information further comprises relation information indicating a relationship between content of the one or more first service components and content of the one or more second service components, and network and address information for accessing the one or more first service components and the one or more second service components,
   wherein the first network is a broadcast network and the second network is a telecommunication network,
   wherein the network and address information for accessing the one or more first service components includes information about a frequency, an Internet protocol (IP) platform, and a first IP address, and
   wherein the network and address information for accessing the one or more second service components includes a uniform resource locator and a second IP address.

2. The method of claim 1, wherein the service type information is signaled in a service fragment of the service discovery information.

3. The method of claim 1, wherein the service discovery information further comprises synchronization information for synchronizing the one or more first service components with the one or more second service components.

4. The method of claim 3, wherein the synchronization information is a relative time difference between the one or more first service components and the one or more second service components.

5. The method of claim 1,
wherein a tag value for the service discovery information is set in a Type Length Value (TLV) packet, and
wherein the service discovery information is included in the TLV packet.

6. The method of claim 1, wherein the relation information is one of mandatory, alternative, complementary, and optional.

7. A client device for receiving service discovery information in a hybrid delivery multimedia transmission system, comprising:
a hardware receiver configured to receive service discovery information related to a service and comprising service type information indicating that the service is provided by a plurality of channels including a first channel of a first network and a second channel of a second network, the second channel being different from the first channel, in a plurality of networks including the first network and the second network, different from the first network; and
a software parser configured to parse the service type information,
wherein one or more first service components of the service are transmitted to the client over the first channel of the first network and one or more second service components which are different from the one or more first service components are transmitted to the client over the second channel of the second network,
wherein the service discovery information further comprises relation information indicating a relationship between content of the one or more first service components and content of the one or more second service components, and network and address information for accessing the one or more first service components and the one or more second service components,
wherein the first network is a broadcast network and the second network is a telecommunication network,
wherein the network and address information for accessing the one or more first service components includes information about a frequency, an Internet protocol (IP) platform, and a first IP address, and
wherein the network and address information for accessing the one or more second service components includes a uniform resource locator and a second IP address.

8. The client device of claim 7, wherein the service type information is signaled in a service fragment of the service discovery information.

9. The client device of claim 7, wherein the service discovery information further comprises synchronization information for synchronizing the one or more first service components with the one or more second service components.

10. The client device of claim 9, wherein the synchronization information is a relative time difference between the one or more first service components and the one or more second service components.

11. The client device of claim 7,
wherein a tag value for the service discovery information is set in a Type Length Value (TLV) packet, and
wherein the service discovery information is included in the TLV packet.

12. The client device of claim 7, wherein the relation information is one of mandatory, alternative, complementary, and optional.

* * * * *